United States Patent
Roy

(10) Patent No.: US 9,034,069 B2
(45) Date of Patent: May 19, 2015

(54) ENGINEERED TOPSOIL FOR USE IN LAND RECLAMATION AND A METHOD OF PRODUCING THE SAME

(75) Inventor: Julie Linda Roy, Montreal (CA)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 153 days.

(21) Appl. No.: 13/292,361

(22) Filed: Nov. 9, 2011

(65) Prior Publication Data

US 2012/0118034 A1     May 17, 2012

Related U.S. Application Data

(60) Provisional application No. 61/413,140, filed on Nov. 12, 2010.

(51) Int. Cl.

| | | |
|---|---|---|
| *C05F 11/00* | (2006.01) | |
| *C05F 11/02* | (2006.01) | |
| *C05D 9/00* | (2006.01) | |
| *B09B 1/00* | (2006.01) | |
| *A01C 21/00* | (2006.01) | |
| *A01G 7/00* | (2006.01) | |
| *B09C 1/00* | (2006.01) | |

(52) U.S. Cl.
CPC . *C05F 11/02* (2013.01); *A01G 7/00* (2013.01); *C05F 11/00* (2013.01); *C05D 9/00* (2013.01); *B09C 1/00* (2013.01); *A01C 21/007* (2013.01)

(58) Field of Classification Search
USPC ........................................ 71/11–24
See application file for complete search history.

(56) References Cited

U.S. PATENT DOCUMENTS

| | | | |
|---|---|---|---|
| 2,797,985 A * | 7/1957 | Larson ................... | 71/8 |
| 2,861,877 A * | 11/1958 | Geraghty et al. .......... | 71/13 |
| 3,198,620 A * | 8/1965 | Larson .................. | 71/1 |
| 5,472,475 A | 12/1995 | Adam | |
| 6,302,936 B1 * | 10/2001 | Adam ................. | 71/13 |
| 2002/0069685 A1 | 6/2002 | Adam | |
| 2002/0174697 A1 * | 11/2002 | Reid et al. ............ | 71/23 |

OTHER PUBLICATIONS

Almendros et al., "Preservation of Aliphatic Macromolecules in Soil Humins", Organic Geochemistry, vol. 24, No. 6/7, pp. 651-659 (1996).
Chang et al., "Coal Weathering and the Geochemical Carbon Cycle", Geochimica et Cosmochimica Acta, vol. 63, No. 19/20, pp. 3301-3310 (1999).
Garbarini et al., "Influence of Soil Organics on the Sorption of Toluene and Trichloroethyene", Environmental Science Technology, vol. 20, pp. 1263-1269 (1986).
Glaser et al., "Black Carbon in Density Fractions of Anthropogenic Soils of the Brazilian Amazon Region", Organic Geochemistry, vol. 31, pp. 669-678 (2000).
Rice et al., "Statistical Evaluation of the Elemental Composition of Humic Substances", Organic Geochemistry, vol. 17, No. 5, pp. 635-648 (1991).
Schmidt et al., "Charred Organic Carbon in German Chernozemic Soils", European Journal of Soil Science, vol. 50, pp. 351-365 (1999).
Schmidt et al., "Black Carbon in Soils and Sediments: Analysis, Distribution, Implications, and Current Challenges", Global Biogeochemical Cycles, vol. 14, No. 3, pp. 777-793 (2000).
Song et al., "Black Carbon and Kerogen in Soils and Sediments: 1. Quantification and Characterization", Environmental Science of Technology, vol. 36, pp. 3960-3967 (2002).
Spycher et al., "Carbon and Nitrogen in the Light Fraction of a Forest Soil: Vertical Distribution and Seasonal Patterns", Soil Science, vol. 135, No. 2, pp. 79-87 (1983).
Wardle et al., "The Charcoal Effect in Boreal Forests: Mechanisms and Ecological Consequences", Oecologica, vol. 115, pp. 419-426 (1998).

* cited by examiner

*Primary Examiner* — Wayne Langel
(74) *Attorney, Agent, or Firm* — Glenn T. Barrett; Andrew T. Ward

(57) ABSTRACT

An engineered topsoil for use in soil reclamation and a method of producing the same are disclosed that seek to replicate undisturbed native reference topsoil from near the site in need of land reclamation. The engineered topsoil is formed from a base amount of subsoil and amendment comprised of an effective amount of surrogate humin material sufficient to replicate the estimated humin organic carbon content of the native reference topsoil, and an effective amount of plant residue material sufficient to replicate the estimated non-humin organic carbon content of the native reference topsoil.

18 Claims, No Drawings

ENGINEERED TOPSOIL FOR USE IN LAND RECLAMATION AND A METHOD OF PRODUCING THE SAME

CROSS REFERENCE TO RELATED APPLICATION

This application relates and claims priority to U.S. Provisional Patent Application No. 61/413,140, filed on Nov. 12, 2010.

FIELD OF THE INVENTION

The present invention relates to an engineered topsoil for use in land reclamation and a method of producing the same. In particular, the present invention relates to an engineered topsoil produced from native B-horizon or C-horizon subsoil sharing the same parent geological material as that of the native A-horizon topsoil needing to be replaced. The engineered topsoil contains a mixture of materials whose composition is dictated by properties measured in undisturbed native reference topsoil found near the site needing to be reclaimed. In particular, the present invention relates to the engineering of topsoil by exposing the native subsoil to repeated cultivation and wetting and drying cycles following treatment with generous, theory based, amounts of a mixture containing an inert surrogate humin and plant residues varying in resistance to microbial decomposition.

BACKGROUND OF THE INVENTION

Soil is a relatively thin layer of unconsolidated material formed on the earth's surface, which develops from the interactions of air, water, plants and animals with parent geological material such as consolidated rock or material that has been deposited by wind, water, or ice. It typically takes thousands of years for centimeters of topsoil to form. This is because weathering or the physical breakdown of rocks into progressively smaller pieces, the transformation of primary minerals into secondary ones, and the churning of soil by plants and animals are all very slow processes under natural conditions, especially in temperate regions.

Native undisturbed soil typically displays a vertical sequence of layers differing in appearance and physical properties. The uppermost mineral layer is commonly referred to as topsoil. It corresponds to the plow layer of cultivated soils, or the A-horizon of undisturbed native soils. The thickness of a plow layer is typically 15 to 20 cm, but that of an undisturbed A-horizon layer may vary widely (e.g. up to 60 cm). The A horizon is characteristically enriched in organic matter and darker-colored than the underlying soil. By convention (e.g. in Canada), it must contain less than 17% w/w organic carbon or it would be described as organic soil.

The layer below the A-horizon is the B-horizon. The B-horizon is recognized by the accumulation of clay and humus having come from the A horizon. The depth of the B horizon depends on the intensity and duration of soil development. It can be absent in young soils. The C-horizon is the layer of unconsolidated material below the A- or B-horizon. It is the layer of undifferentiated unconsolidated material sitting on top of the consolidated rock or parent geological material. The layers below the A-horizon are generally referred to as the subsoil.

Generally, subsoil does not have the chemical (i.e., fertility) and physical (i.e., tilth) characteristics to sustain high plant productivity over time. It is often very difficult to treat subsoil such that it acquires and retains the same fertility as natural topsoil. Even when copious amounts of organic amendments, such as manure, are added to subsoil to increase its organic carbon content, amended subsoil rarely behaves like natural topsoil. There are several possible reasons for this, including that organic carbon in manure, straw or compost differs widely from naturally aged organic carbon (i.e. humus) formed in topsoil in terms of stability and susceptibility to microbial decomposition. Most commonly used organic amendments are readily degradable by microbial soil decomposers compared to humus and undergo rapid decomposition in soil. As a result, only a minute fraction of carbon added in the form of readily decomposable organic amendments typically ends up making the conversion into more recalcitrant humus in the soil.

Current regulatory requirements (e.g., in Canada) for the closure of oil and gas well sites require returning the sites to pre-disturbance agricultural productivity levels. This reclamation typically requires importing natural topsoil to spread onto the site, and demonstrating equivalent plant productivity of the reclaimed land. Prior to the mid-1970s, there were no land reclamation regulations and little incentive to conserve stripped native topsoil for later re-use in site reclamation. As a result, stripped native topsoil was generally hauled away to nearby farmlands where it can no longer be found or retrieved. Stripping topsoil during well site construction is considered necessary to improve the mechanical foundation quality of the soil and to facilitate vegetation control and minimize the risk of brush fires. Many of the well sites built in the early 1970s and earlier have reached the end of their useful operational life and now require abandonment and reclamation. Few have access to stockpiles of salvaged native topsoil. As a result, most of these sites now require that topsoil be imported from other locations to meet current land reclamation standards. The availability for purchase of topsoil of acceptable quality tends to vary as a function of the frequency and magnitude of large-scale land development projects in the vicinity of the site. In remote areas and rural regions where land development projects are unusual, the importation of native topsoil from distant construction sites is often very difficult and expensive.

In these remote and rural areas and elsewhere when topsoil is not readily available, there is a need to develop engineered topsoil in situ.

Others have attempted to produce artificial topsoil from recycled materials. U.S. Pat. No. 5,472,475 to Adam discloses the production of artificial topsoil by combining either dredged river silt, sand or basalt, and cellulose from recycled paper or yard waste, with composted animal or human waste for general reclamation and cereal crops, or vegetable or fruit residuals for gardens or potting soil. Adam further discloses the addition of calcium in the form of calcium silicate as slag or lime and ammonium nitrate or sulfate mixed with water. Charcoal or an equivalent amount of phosphorus, sodium, and sulfur as are present in charcoal is then added in small amounts. The process disclosed by Adam is not particularly well suited for in situ topsoil engineering nor is it appropriate for use in jurisdictions where the success of land reclamation must be demonstrated on the basis of prescribed measurements designed to show that the engineered topsoil has equivalent chemical composition and productive capability as that of the native surrounding topsoil at any given location.

A rate of soil genesis of one cm per year is considered exceptionally rapid in most world locations. In some regions (e.g., Canada), one mm per year can be expected. There is a need to increase the rate of topsoil formation. There is a need to engineer topsoil at a much higher than natural rate of soil formation.

SUMMARY OF THE INVENTION

In one aspect of the invention, a method of engineering topsoil from subsoil for use in land reclamation is provided. The method is effectively creating topsoil from subsoil at a rate that is higher than topsoil formation under natural conditions. The method includes providing a base amount of subsoil. The subsoil is native subsoil from the site needing land reclamation. It is contemplated that the subsoil may comprise native B-horizon subsoil and/or native C-horizon subsoil. The method further includes identifying the desired specification of the engineered topsoil by measuring selected characteristics measured in native A-horizon reference topsoil. Native A-horizon reference topsoil is undisturbed native topsoil found near the site needing to be reclaimed.

The method of engineering topsoil from subsoil for use in land reclamation further includes adding an effective amount of surrogate humin material to the subsoil. The effective amount of surrogate humin material is sufficient to replicate the humin organic carbon content of the native A-horizon reference topsoil. The surrogate humin material may include at least one of wood charcoal and lignite char dust. The surrogate humin material preferably has a mean particle diameter of less than about 0.5 mm.

The method of engineering topsoil from subsoil for use in land reclamation further includes adding an effective amount of plant residue material to the subsoil. The effective amount of plant residue material is determined by estimating the non-humin organic carbon content of the native reference topsoil. The calculated effective amount of plant residue material is the organic carbon content equivalent of the estimated non-humin organic carbon content of the native reference topsoil. The calculated effective amount of plant residue material is preferably adjusted upwardly to compensate for an expected gradual carbon loss from the plant residue material of about 50% to 60% in the form of $CO_2$. The plant residue material preferably includes a mixture of readily degradable and recalcitrant plant residues. The plant residue material has a carbon to nitrogen ratio of between about 20:1 and 25:1. The plant residue material has a mean particle diameter of less than about 2.5 cm. The plant residue material preferably includes sawdust, barley straw, and alfalfa hay. The sawdust is preferably produced from species of coniferous or deciduous trees naturally occurring in the area where land reclamation is to take place. The plant residue material may be mixed with an inorganic fertilizer.

In one aspect of the present invention, the addition of the effective amount of surrogate humin material may be added to the subsoil in one amount or dose. Preferably, the effective amount of surrogate humin material is divided into two or more portions, which are added to the subsoil over a predetermined time period. Preferably, a first portion of the effective amount of surrogate humin material may be added at a first predetermined time, which typically occurs at the onset of the process for engineering topsoil. A second portion of the effective amount of surrogate humin material may be added to the subsoil at a second predetermined time, which occurs after the first predetermined time.

In one aspect of the present invention, the addition of the effective amount of plant residue material may be added to the subsoil in one amount or dose. Preferably, the effective amount of plant residue material is divided into two or more portions, which are added to the subsoil over a predetermined time period. Preferably, a first portion of the effective amount of plant residue material is added at the first predetermined time at the same time as the first portion of the surrogate humin material. A second portion of the effective amount of plant residue material is added to the subsoil at the second predetermined time at the same time as the second portion of the surrogate humin material.

The method of engineering topsoil further includes preparing the subsoil for the addition of the effective amount of plant residue material and the effective amount of surrogate humin material. The preparation of the subsoil may include loosening the soil and breaking down larger aggregates into smaller aggregates. The depth of subsoil preparation is based upon the desired depth of engineered topsoil to be formed. For example, the formation of approximately 10 cm of topsoil may require preparing the subsoil to a depth of 20 cm or more.

The method of engineering topsoil from subsoil for use in land reclamation further includes mixing the subsoil, plant residue material and surrogate humin material to form an amended subsoil. The plant residue material and the surrogate humin material are preferably mixed with the subsoil to the depth of subsoil preparation (e.g., approximately 20 cm). The subsoil, plant residue material and surrogate humin material are mixed to form an amended subsoil. It is contemplated that the surrogate humin material and the plant residue material may be added separated or they may be premixed together prior to addition to the subsoil. The base amount of subsoil is preferably mixed with the first portion of the effective amount of surrogate humin material and the first portion of the effective amount of plant residue material at the time the materials are added to the subsoil and at least once between the first predetermined time and the second predetermined time. The base amount of subsoil is preferably mixed with the second portion of the effective amount of surrogate humin material and the second portion of the effective amount of plant residue material at least once at or after the second predetermined time when the materials are added to the subsoil.

The method of engineering topsoil from subsoil for use in land reclamation further includes physically disturbing the amended subsoil. The physical disturbance of the amended subsoil includes using at least one of conventional cultivation implements or other available methods to stir and mix soil. The method may further benefit from exposure of the amended subsoil to wetting and drying cycles, freezing and thawing episodes, and the activities of burrowing soil organisms.

In one aspect of the present invention, an engineered topsoil for use in land reclamation is provided. The engineered topsoil includes a base amount of subsoil, an effective amount of surrogate humin material sufficient to replicate the estimated humin carbon content of the native reference topsoil, and an effective amount of plant residue material sufficient to replicate the estimated non-humin carbon content of the native reference topsoil. The surrogate humin material includes at least one of wood charcoal and lignite char dust. The surrogate humin material preferably has a mean particle diameter of less than about 0.5 mm.

The effective amount of plant residue material is determined by estimating the non-humin organic carbon content of the native reference topsoil. The calculated effective amount of plant residue material is the organic carbon content equivalent of the estimated non humin organic carbon content of the native reference topsoil. The calculated effective amount of plant residue material is preferably adjusted upwardly to compensate for an expected gradual carbon loss from the plant residue material of about 50% to 60% (w/w) in the form of $CO_2$. The plant residue material comprises of a mixture of readily degradable and recalcitrant plant residues. The plant residue material has a carbon to nitrogen ratio of between about 20:1 and 25:1. The plant residue material preferably has a mean particle diameter of less than about 2.5 cm. The plant residue material preferably includes sawdust, barley straw, and alfalfa hay. The plant residue material may be mixed with an inorganic fertilizer. The subsoil is native B- or C-horizon subsoil from the site needing land reclamation.

DETAILED DESCRIPTION OF THE INVENTION

A method of engineering topsoil from subsoil for use in land reclamation will now be described in greater detail in accordance with aspects of the present invention. The method produces topsoil from native subsoil that replicates the characteristics of the native reference topsoil. The method includes modifying a base subsoil (either B- or C-horizon material) at the reclamation site by amending the base subsoil with one or more components. Preferably, the amendment to the base subsoil contains at least a surrogate humin organic carbon component and a non-humin organic carbon component.

It is an object of the present invention to ensure that the newly built soil has a similar mineralogy, structure and organic carbon chemistry as the native topsoil it is meant to replace. This can be achieved by starting from local material of similar parent geological origin (e.g., B- or C-horizon material present at the reclamation site) and by encouraging soil structure development and the rapid establishment of near-equilibrium size organic carbon pools of different turnover rates in the starting material. Most oil and gas well sites have been stripped of their topsoil still have native subsoil in place and it is available for use as a suitable starting material.

First, it is necessary to determine total organic carbon content (TOC), the humin organic carbon content (HOC) and the non-humin organic carbon content (NOC) of both the native A-horizon reference topsoil and the starting subsoil (e.g., B-horizon or C-horizon) at the reclamation site. This is necessary to effectively replicate the native A-horizon reference topsoil, or native reference topsoil. Two or more samples of the native topsoil may be used to determine the TOC, HOC and NOC of the topsoil. It is preferable that the native A-horizon reference topsoil be sampled from the vicinity of the reclamation site. Two or more samples of the subsoil may be used to determine the TOC, HOC and NOC of the subsoil.

TOC, HOC and NOC are experimentally estimated. The TOC may be determined using either the dry (furnace) or wet (acid dichromate) oxidation methods, or any other available accepted method. The HOC may be estimated using the following technique. The reference soil is extracted at least twice using 0.5 M NaOH under $N_2$ to define an extracted soil. The extracted soil is then rinsed using 0.01 M $CaCl_2$ to define an insoluble residue. The insoluble residue is then analyzed for TOC to determine the Humin content. From this, the HOC of the reference topsoil or subsoil may be determined in accordance with the following relationship:

$$\frac{\text{Humin } OC/TOC(\%)}{100} \times TOC(\%) = HOC \text{ of reference soil}(\%, w/w) \quad (1)$$

The non-Humin organic carbon contact (NOC) of the native reference topsoil or subsoil is also determined Non-Humin organic carbon refers to microbially modified organic carbon that has not yet been converted to Humin. It may include partially decomposed plant residues, fulvic acids and humic acids. NOC may be determined based upon the following relationship:

$$TOC(\%) - HOC(\%) = NOC \text{ of reference soil } (\%, w/w) \quad (2)$$

In one nonlimiting example, the determined TOC, HOC and NOC values are set forth in Table 1. All values are expressed in % (w/w).

TABLE 1

| Determined Organic Carbon Content | | |
|---|---|---|
| Type of Organic C | A-Horizon (topsoil) | B-Horizon (subsoil) |
| Humin (HOC) | 3.12 | 0.75 |
| Total (TOC) | 4.45 | 1.07 |
| Non-humin (NOC) | 1.33 | 0.32 |

The estimated values for TOC, HOC and NOC are used to determine the effective composition and quantity of amendments that must be added to the starting subsoil in order to replicate the native reference topsoil. The effective amount of surrogate humin organic carbon that must be added as part of the amendment is determined by subtracting the HOC of the subsoil from the HOC of the reference topsoil.

$$HOC_{(topsoil)} - HOC_{(subsoil)} = HOC_{(amendment)} \quad (3)$$

This provides an approximation of the amount of surrogate humin organic carbon that must be added to the subsoil as part of the amendment to the subsoil. With reference to the non-limiting example in Table 1, the HOC for the amendment is equal to:

$$3.12 - 0.75 = 2.37 \text{ g HOC}/100 \text{ g soil} = HOC_{(amendment)}$$

Suitable surrogate humin organic carbon material for use in the amendment includes wood charcoal and lignite char dust. Powdered wood charcoal is a good surrogate for naturally-derived humin in soil. Wood charcoal offers a large surface area for the sorption of organic matter decomposition products. As such, it can contribute to the aggregation of soil particles and to the accumulation of more recalcitrant organic matter in soil. Wood charcoal is naturally occurring in most soils and non-toxic. It shares many common attributes with humin, such as high aromaticity, relatively low H/C and O/C atomic ratios, low content of O-containing functional groups, and high molecular weight. In addition, wood charcoal contains a lot of small pores that are inaccessible to microorganisms and that can become encrusted with colloidal clay particles. Particles of charcoal can in turn become occluded in soil aggregates and thereby become part of the soil matrix. Organic substances characterized by highly aromatic structures, such as lignin, humin, and wood charcoal, are typically good sorbents for hydrophobic organic compounds in soils. Furthermore, wood charcoal and soil humin will likely interact with biomolecules and organic matter decomposition products via similar mechanisms. The main difference between humin and powdered wood charcoal is that humin should be slightly more biodegradable depending on particle size. Like wood charcoal, lignite char dust has many similar characteristics as soil humin and is a suitable surrogate material for engineering topsoil in accordance with the present invention. Lignite char dust is a by-product of coal production and is readily available. The present invention, however, is not intended to be limited solely to the use of wood charcoal and lignite char dust as suitable organic surrogate humin; rather, it is contemplated that other materials have similar chemical composition, molecular structure and biochemical reactivity may be employed as surrogate. In order to facilitate decomposition, the surrogate humin material preferably has a mean particle diameter of less than about 0.5 mm. The preferred range is 0.3-0.5 mm.

The effective amount of surrogate humin can be determined in accordance with the following relationship:

$$(HOC_{(amendment)}/100 \text{ g soil}) \times (100 \text{ g surrogate}/Y) \times 100 = Z \quad (4)$$

where Y=g of HOC in 100 g of the surrogate humin; and Z is amount of surrogate humin (in grams) per 100 grams of subsoil.

Y can be experimentally determined as described above in connection with the determination of the HOC for the reference topsoil and the subsoil. In the case of wood charcoal, Y has been determined to be 63% (w/w) HOC for wood charcoal and 65% (w/w) HOC for lignite char dust.

With reference to the non-limiting example in Table 1, when charcoal is used as the surrogate, Z is calculated as follows:

(2.37 g humin OC/100 g soil)×(100 g charcoal/63 g humin OC as charcoal)×100=Z=3.76 g charcoal/ 100 g soil.

When lignite char dust is used as the surrogate, Z is calculated as follows:

(2.37 g humin OC/100 g soil)×(100 g lignite char dust/65 g humin OC as lignite char dust)× 100=Z=3.65 g lignite char dust/100 g soil.

The determined effective amount of surrogate humin material is sufficient to replicate the estimated HOC of the native reference topsoil.

The estimated values for TOC, HOC and NOC are used to determine the effective composition and quantity of amendments that must be added to the starting subsoil in order to replicate the native reference topsoil. The effective amount of non-humin organic carbon that must be added in the form of plant residue material as part of the amendment is determined by subtracting the HOC of the reference topsoil from the TOC of the reference topsoil. Typically, the amounts calculated in accordance with the present invention are greater than those amounts used by others in failed attempts to engineer topsoil. The size of the amendment must be sufficient to sustain both microbial respiration and the formation of equilibrium sized pools of humin carbon and non-humin carbon. The effective amount of plant residue material is sufficient to replicate the estimated NOC of the native reference topsoil.

$$TOC_{(topsoil)} - HOC_{(topsoil)} = NOC_{(amendment)} \quad (5)$$

This provides an approximation of the amount of non-humin organic carbon material (e.g., plant residue material or plant mix) that must be added to the subsoil as part of the amendment to the subsoil. With reference to the non-limiting example in Table 1, the mass fraction or NOC for the amendment is equal to:

4.45−3.12=1.33% w/w NOC

Before determining how much plant residue material or plant mix is needed to provide the required amount of non-humin organic C, the composition of the material or mix must be determined. The plant residue material preferably includes a mixture of readily degradable and recalcitrant plant residues. Preferably, the plant mix has a C/N ratio of between 20:1 to 25:1 and a range in substrate quality varying from excellent to poor. A C/N ratio of between 20:1 and 25:1 should achieve a balance between N mineralization and N immobilization rates in soil. This should eliminate the need for short-term N fertilization to stimulate plant mix decomposition. Preferably, the mix contains some finely chopped alfalfa hay, barley or wheat straw, and sawdust. The sawdust is preferably formed from species of either deciduous or coniferous trees naturally occurring in the area where land reclamation is to take place. The present invention is not intended to be limited to the use of hay, barley and straw; rather, other materials are considered to be well within the scope of the present invention provided the mixture achieves the desired C/N ratio. Other finely chopped organic products or wastes could be included as long as at least one third of the mix is of readily biodegradable material of low C/N ratio. It is contemplated that the mix contains plant material and waste materials that are native to the region in which the reclamation site is located. No ecotoxicity should be associated with any of the plant mix components. In one non-limiting example of the present invention, alfalfa hay could serve as a readily degradable fraction, straw as a fraction having an intermediate half-life in the soil, and sawdust as the most slowly biodegradable fraction of the three.

Once the possible plant mix components have been chosen, subsamples of each are analyzed for organic C and total N. A plant mix composition is developed that will yield the desired C/N ratio of between 20:1 and 25:1. The mix is prepared and its organic C content is calculated. The amount of plant mix that must be added to the subsoil is calculated by assuming that 50-60% of the plant mix organic C added will be lost as $CO_2$ in a 5-10 year time period. As such only 40-50% of the added plant mix organic C is expected to remain in subsoil for up to 10 years due to conversion into various biomolecules and humic substances. In order to facilitate decomposition, the components should be chopped into smaller pieces. Preferably, particle size of the components of the plant mix material should not exceed 2.5 cm. It is contemplated that the plant mix material may also contain a fertilizer.

The effective amount of non-humin organic carbon material to include in the amendment to the subsoil may be determined in accordance with the following:

$$2 \times (NOC_{(amendment)} \text{ (g)/kg soil}) \times (100 \text{ g plant mix}/W \text{ g NOC in plant mix}) = X \quad (6)$$

where 2 is the correction factor for expected losses as $CO_2$, W=g of NOC in 100 g of plant mix; and X is amount of plant mix (in grams) per kg of subsoil. The correction factor may vary. For example, it may be greater than two if it is expected that greater than 50-60% of the plant mix organic C is lost as $CO_2$. Alternatively, the correction factor may be less than two if it is expected that less than 50% of the plant mix organic C is lost as $CO_2$.

W can be experimentally determined as described above in connection with the determination of the HOC for the reference topsoil and the subsoil. In one non-limiting example, W was determined to be 45% (w/w). This provides an approximation of the amount of non-humin organic carbon material (e.g., plant residue material or plant mix) that must be added to the subsoil as part of the amendment to the subsoil. With reference to the non-limiting example in Table 1 and a plant mix having a 45% (w/w) NOC, the amount of plant mix required is equal to:

2×(1.33 g/kg soil)×(100 g plant mix/45 g non-humin OC in plant mix)=5.91 g plant mix/kg of soil Once the amounts of surrogate humin material (e.g., charcoal or lignite char dust) and non-humin material (e.g., plant mix) have been determined, the total amount of material required will be determined based upon the desired depth of topsoil that must be engineered at the reclamation site. Regulations typically require the topsoil replacement depth be a percentage of the depth of the native reference topsoil. This depth will vary based upon the depth of original native topsoil in the vicinity of the reclamation site and local regulatory requirements. In order to properly determine the depth of the native reference topsoil to be replaced at the reclamation site, the depth of the native topsoil should be assessed at several sampling locations surrounding the reclamation site.

Once the depth of replacement topsoil required has been determined and the starting B- or C-horizon material has been exposed at the surface, the amount of charcoal and plant mix that should be added should be calculated as follows:

$$\text{Surrogate humin material needed (kg/kg soil)} \times \text{Area} \\ (m^2) \times \text{Depth (m)} \times \text{Dry bulk density (Mg/m}^3) = \text{Mg} \\ \text{of surrogate humin material} \quad (7)$$

$$\text{Plant mix needed (kg/kg soil)} \times \text{Area (m}^2) \times \text{Depth (m)} \times \\ \text{Dry bulk density (Mg/m}^3) = \text{Mg of plant mix} \quad (8)$$

The dry bulk density of unconsolidated solids is determined by dividing the mass of an oven-dried sample of dried solids (in Mg) by the volume the sample occupies ($m^3$). In one non-limiting example, the dry bulk density of charcoal was determined to be 0.5 $Mg/m^3$ and that of the plant mix to be 0.2 $Mg/m^3$. With reference to the non-limiting example in Table 1 and the values calculated above, the amount of surrogate humin material and plant mix needed can be easily determined. For purposes of illustration, in one non-limiting example, the reclamation site has an area of 30 m×12 m and engineered topsoil is needed to a depth of 0.3 m. The amount of materials needed is as follows:

$$\text{Charcoal needed} = 0.038 \text{ kg/kg} \times (30 \times 12) m^2 \times 0.30 \\ m \times 0.5 \text{ Mg/m}^3 = 2.05 \text{ Mg}$$

$$\text{Plant mix needed} = 0.059 \text{ kg/kg} \times (30 \times 12) m^2 \times 0.30 \\ m \times 0.2 \text{ Mg/m}^3 = 1.27 \text{ Mg}$$

Prior to use in the reclamation site, the charcoal and plant mixes calculated above are prepped for addition to the subsoil. This may include chopping or breaking down the charcoal/lignite char dust and the plant mix to the desired size. As discussed above, smaller sized particles will decompose more readily and interact more closely with mineral soil particles. As such, it is desirable that the plant mix be chopped to have a mean particle size of no more than 2.5 cm. The charcoal or lignite char dust may need to be crushed such that it has a mean particle size of less than about 0.5 mm. In preparation for the addition to the subsoil, the charcoal/lignite char dust and the plant mix may be combined into a single mixture. This is desirable to ensure a thorough and homogeneous blend of the charcoal and plant mix in the soil amendment. The present invention, however, is not intended to be limited to a pre-mixture; rather, it is contemplated that the charcoal and plant mix may be added separately and mixed with the subsoil in situ.

Prior to the addition of any of amendment to the subsoil, the reclamation site is prepared, which includes but is not limited to the removal of any gravel, rocks and other large debris from the site to expose the subsoil for use in the reclamation. It may further include performing any necessary grading of the site and breaking down larger aggregates into smaller aggregates. The base subsoil (either B-horizon material or C-horizon material) is then loosened to desired depth or slightly greater than the desired depth of topsoil engineering. The loosening may be achieved by using conventional cultivation implements. The present invention, however, is not intended to be limited solely to cultivating or tilling the subsoil for subsoil preparation; rather, other techniques that are capable of loosening the subsoil are considered to be well within the scope of the present invention.

The amendment is then added to the loosened subsoil. The effective amount of the amendment to the subsoil is preferably divided in half and added to the subsoil in two doses. The first portion of the effective amount of the amendment is preferably added to the subsoil after the last frost of the season such that the amendment may soon begin to decompose when mixed with the subsoil. The first portion of the amendment may be thoroughly mixed with the subsoil through cultivating or other suitable means. The amendment is effectively incorporated into the subsoil no deeper than to the desired depth of topsoil engineering.

The first portion of the amendment and the subsoil are mixed at least once before the second portion of the amendment is added to the subsoil. Preferably, the first portion of the amendment and the subsoil are preferably mixed at least twice before the addition of the second portion of the amendment. The further mixing may be accomplished through cultivating or other suitable means. Preferably, the mixing occurs in one month intervals. This scheduled mixing improves the blending of the amendment into the soil and stimulates the microbial decomposition of the same.

During this time, it is desirable to control weed growth. Weeds, if not controlled, will compete with desirable plants and suppress their growth and production.

After the scheduled mixings, the second portion of the amendment is added to the partially amended subsoil. This is preferably done in the same year at the end of the growing cycle. The second portion of the amendment is then mixed with the subsoil by cultivating the subsoil one or more times to the depth of desired topsoil engineering.

At the start of the following growing season (e.g., after the last heavy frost), the reclamation site is seeded. The seeds are selected based upon the geographical location of the reclamation site such that appropriate seeds are used. Barley, field peas and native pasture seed mixes are considered to be suitable for aboveground plant growth. The seeded area may be fertilized as needed. The site is irrigated, if possible, to avoid crop failure. It is also desirable to control weed growth. At the end of the growing season, the whole crop or its residues are incorporated into the subsoil by cultivation. This process is repeated on a seasonal basis. Several growing seasons (e.g., 5 to 10 depending on the region) and repeated seeding will be required to develop the soil structure and organic carbon pools necessary to impart sustainable fertility and productivity to the engineered topsoil. During these seasons, the topsoil engineering process will further benefit from wetting and drying cycles, freezing and thawing episodes, and the activities of burrowing soil organisms. With this process, it is possible to achieve topsoil formation at a rate of 1-2 cm per year.

There are numerous potential economic benefits of the present invention. These include a reduced reliance on an irregular and limited supply of commercially available topsoil and better control on reclamation planning. Potential technical benefits include the production of topsoil of similar quality and functionality as native topsoil and that has no equivalent in the market anywhere.

It will be apparent to those skilled in the art that various modifications and/or variations may be made without departing from the scope of the present invention. While the present invention has been described in the context of land reclamation, the present invention is not intended to be so limited; rather, it is contemplated that the topsoil engineering method disclosed herein may be used in other situations where there is need for topsoil. Thus, it is intended that the present invention covers the modifications and variations of the method herein, provided they come within the scope of the appended claims and their equivalents.

What is claimed is:

1. A method of engineering topsoil in situ from subsoil at a land reclamation site, comprising:
   (i) selecting a native reference topsoil to replicate;
   (ii) preparing the subsoil at the land reclamation site by loosening the subsoil to at least the depth of the topsoil engineering;
   (iii)(a) determining a total effective amount of surrogate humin material sufficient to replicate an estimated humin organic carbon content of the native reference topsoil by estimating the humin organic carbon content of the native reference topsoil, and calculating the total effective amount of surrogate humin material sufficient to replicate the estimated humin organic carbon content of the native reference topsoil;
   (iii)(b) determining a total effective amount of plant residue material sufficient to replicate an estimated non-humin organic carbon content of the native reference topsoil by estimating the non-humin organic carbon content of the native reference topsoil by subtracting the estimated humin organic carbon content of the native reference topsoil from the total carbon content of the native reference topsoil, and calculating the total effective amount of plant residue material sufficient to replicate the estimated non-humin organic carbon content of the native reference topsoil, wherein calculating the total effective amount of plant residue material includes adjusting the effective amount of plant residue material to compensate for an expected carbon loss from the plant residue material in the form of $CO_2$;
   (iii)(c) adding a first portion of the total effective amount of plant residue material to the loosened subsoil and mixing the added plant residue material with the loosened subsoil;
   (iv) adding a first portion of the total effective amount of surrogate humin material to the loosened subsoil and mixing the added surrogate humin material with the loosened subsoil:
   (v) adding and mixing a second portion of the total effective amount of plant residue material to the loosened subsoil after the first portion of the soil amendment material has been mixed into the loosened subsoil in an amount sufficient to replicate the estimated non-humin organic carbon content of the native reference topsoil;
   (vi) adding and mixing a second portion of the total effective amount of surrogate humin material to the loosened subsoil after the first portion of the surrogate humin material has been mixed into the loosened subsoil in an amount sufficient to replicate the estimated humin organic carbon content of the native reference topsoil to form an amended subsoil as an engineered topsoil having selected characteristics that replicate the native reference topsoil.

2. The method of engineering topsoil from subsoil according to claim 1, wherein the calculated effective amount of plant residue material is adjusted upwardly to compensate from an expected carbon loss from the plant residue material of about 50% to 60% [w/w] in the form of $CO_2$.

3. The method of engineering topsoil from subsoil according to claim 1, further comprising:
   physically disturbing the amended subsoil using at least one of cultivation implements or other available methods to stir and mix the amended subsoil; and exposing the amended subsoil to wetting and drying cycles, freezing and thawing episodes, and the activities of burrowing soil organisms.

4. The method of engineering topsoil from subsoil according to claim 1, wherein the surrogate humin material is at least one member selected from the group consisting of charcoal and lignite char dust.

5. The method of engineering topsoil from subsoil according to claim 1, wherein the surrogate humin material has a mean particle diameter of less than about 0.5 mm.

6. The method of engineering topsoil from subsoil according to claim 1, wherein the plant residue material comprises a mixture of readily degradable and recalcitrant plant residues.

7. The method of engineering topsoil from subsoil according to claim 1, wherein the plant residue material has a carbon to nitrogen ratio of between about 20:1 and 25:1.

8. The method of engineering topsoil from subsoil according to claim 1, wherein the plant residue material has a mean particle diameter of less than about 2.5 cm.

9. The method of engineering topsoil from subsoil according to claim 1, wherein the plant residue material comprises a mixture of sawdust, barley straw, and alfalfa hay.

10. The method of engineering topsoil from subsoil according to claim 1, further comprising mixing an inorganic fertilizer with the plant residue material.

11. The method of claim 1 in which the first portion of the plant residue material and the first portion of the surrogate humin material are mixed together to form a first portion of soil amendment material which is added to the loosened subsoil and mixed into the loosened subsoil.

12. The method of claim 11 in which the second portion of the surrogate humin material the first portion and the second portion of the surrogate humin material are mixed together to form a second portion of soil amendment material which is added to the loosened subsoil after the first portion of the soil amendment material has been mixed into the loosened subsoil in an amount sufficient to replicate the estimated humin organic carbon content and the estimated non-humin organic carbon content of the native reference topsoil.

13. The method of claim 12 in which the first portion of the soil amendment material is added to and mixed into the loosened topsoil after the last frost of a season.

14. The method of claim 13 in which the second portion of the soil amendment material is added to and mixed into the loosened topsoil in the same year as the first portion is added and at the end of the season growing cycle.

15. The method of claim 1 in which the first portion of the plant residue material is added to and mixed into the loosened topsoil after the last frost of a season.

16. The method of claim 1 in which the first portion of the surrogate humin material is added to and mixed into the loosened topsoil after the last frost of a season.

17. The method of claim 1 in which the second portion of the plant residue material is added to and mixed into the loosened topsoil in the same year as the first portion is added and at the end of the season growing cycle.

18. The method of claim 1 in which the second portion of the surrogate humin material is added to and mixed into the loosened topsoil in the same year as the first portion is added and at the end of the season growing cycle.

* * * * *